United States Patent
Yamaguchi et al.

(10) Patent No.: US 9,274,404 B2
(45) Date of Patent: Mar. 1, 2016

(54) DUAL FUNCTION PROJECTOR

(71) Applicant: Seiko Epson Corporation, Tokyo (JP)

(72) Inventors: Kaoru Yamaguchi, Chino (JP); Tadashi Kinebuchi, Okaya (JP); Shuji Narimatsu, Suwa (JP); Hiroyuki Moteki, Shiojiri (JP); Hirofumi Kasuga, Matsumoto (JP); Hidehito Iisaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 291 days.

(21) Appl. No.: 13/947,908

(22) Filed: Jul. 22, 2013

(65) Prior Publication Data

US 2014/0022515 A1    Jan. 23, 2014

(30) Foreign Application Priority Data

Jul. 23, 2012    (JP) ................ 2012-162388

(51) Int. Cl.
| | |
|---|---|
| G03B 21/14 | (2006.01) |
| G03B 21/00 | (2006.01) |
| G03B 5/02 | (2006.01) |
| G03B 21/53 | (2006.01) |
| H04N 9/31 | (2006.01) |
| G03B 21/20 | (2006.01) |
| G03B 33/12 | (2006.01) |
| G09G 3/00 | (2006.01) |

(52) U.S. Cl.
CPC ............ *G03B 21/005* (2013.01); *G03B 5/02* (2013.01); *G03B 21/14* (2013.01); *G03B 21/142* (2013.01); *G03B 21/208* (2013.01); *G03B 21/2033* (2013.01); *G03B 21/2053* (2013.01); *G03B 21/53* (2013.01); *G03B 33/12* (2013.01); *G09G 3/001* (2013.01); *H04N 9/3105* (2013.01); *H04N 9/317* (2013.01); *H04N 9/3132* (2013.01); *H04N 9/3197* (2013.01); *G09G 2330/026* (2013.01)

(58) Field of Classification Search
CPC .. G03B 21/005; G03B 21/2053; G03B 21/14; G03B 21/2033; G03B 33/12; G03B 21/142; G03B 5/02; G03B 21/53; H04N 9/317; H04N 9/3197; H04N 9/3105; H04N 9/3132
See application file for complete search history.

(56) References Cited

U.S. PATENT DOCUMENTS

| | | | |
|---|---|---|---|
| 2007/0273849 A1* | 11/2007 | Takeda | .......... 353/122 |
| 2012/0236270 A1* | 9/2012 | Maruyama | .......... 353/101 |

FOREIGN PATENT DOCUMENTS

| | | |
|---|---|---|
| JP | 2005-099588 | 4/2005 |
| JP | 2006-227143 | 8/2006 |
| JP | 2007-072322 | 3/2007 |
| JP | 2010-027586 | 2/2010 |
| JP | 2011-249976 | 12/2011 |
| JP | 4898173 B2 | 3/2013 |

* cited by examiner

*Primary Examiner* — William C Dowling
*Assistant Examiner* — Magda Cruz
(74) *Attorney, Agent, or Firm* — Maschoff Brennan

(57) ABSTRACT

A projector includes a light source; a spatial light modulation device which modulates light from the light source according to an image that is written; a light diffusion device which adjusts a degree of diffusion of the light incident on the spatial light modulation device or the light emitted from the spatial light modulation device; and a light diffusion controller which controls the light diffusion device so that the light diffusion device diffuses the light when the light source starts to light up.

19 Claims, 13 Drawing Sheets

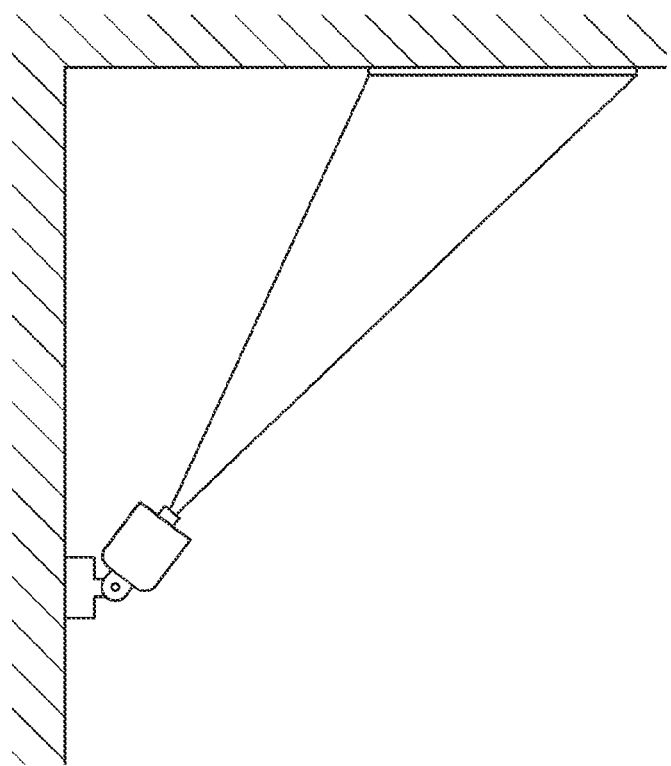
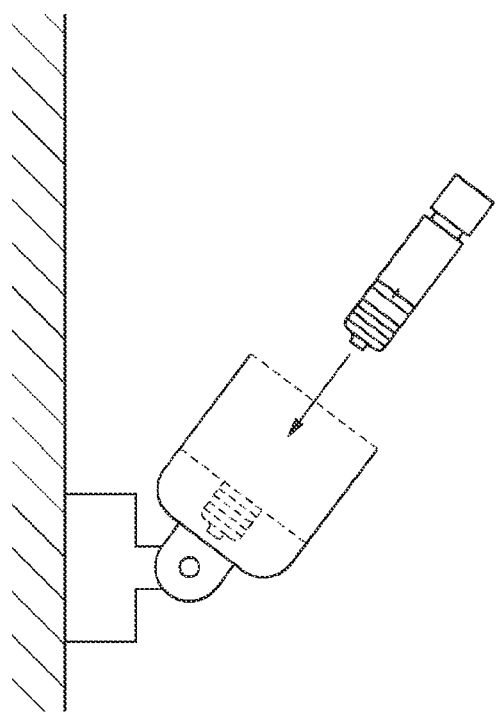
FIG. 13B
FIG. 13A

DUAL FUNCTION PROJECTOR

The entire disclosure of Japanese Patent Application No. 2012-162388, filed Jul. 23, 2012 is expressly incorporated by reference herein.

BACKGROUND

1. Technical Field

The present invention relates to a projector that can also function as an illumination device, and a control method for the same.

2. Related Art

A projector which is fixed to a power feed terminal such as a socket of an illumination device and receives supply of power from the power feed terminal is known (FIGS. 13A and 13B, JP-A-2005-99588 and JP-A-2006-227143). Also, a technique of diffusing and dimming light from a light emitting diode used as a light source of an illumination apparatus according to need by a polymer dispersed liquid crystal dimming shutter is known (JP-A-2010-27586). Moreover, an image display device having a mode in which a lamp on the display device lights up directly when an AC power supply is inputted is known (JP-A-2007-72322).

When providing a projector that can function as an illumination device, the addition of the function as an illumination device may cause the user to find it troublesome to start up the projector. However, the above literature gives no information about such problems.

SUMMARY

An advantage of some aspects of the invention is to solve at least a part of the problems described above, and the invention can be implemented as the following forms or application examples.

APPLICATION EXAMPLE 1

One aspect of the invention is directed to a projector including: a light source; a spatial light modulation device which modulates light from the light source according to an image that is written; a light diffusion device which adjusts a degree of diffusion of the light incident on the spatial light modulation device or the light emitted from the spatial light modulation device; and a light diffusion controller which controls the light diffusion device so that the light diffusion device diffuses the light when the light source starts to light up.

APPLICATION EXAMPLE 2

According to another aspect of the invention, the projector further includes a power receiving terminal, and the light source starts to light up when electric power starts to be supplied to the power receiving terminal.

APPLICATION EXAMPLE 3

According to another aspect of the invention, the projector further includes a display controller which writes an image for illumination projection into the spatial light modulation device when the light source starts to light up.

APPLICATION EXAMPLE 4

According to another aspect of the invention, the projector further includes a storage unit, when information indicating illumination projection is stored in the storage unit, the light diffusion controller controls the light diffusion device so that the light diffusion device diffuses the light when the light source starts to light up, and when information indicating image projection is stored in the storage unit, the light diffusion controller controls the light diffusion device so that the light diffusion device does not substantially diffuse the light when the light source starts to light up.

APPLICATION EXAMPLE 5

According to another aspect of the invention, the projector further includes a receiving unit which receives an image projection command, and in response to the reception of the image projection command by the receiving unit, the light diffusion controller controls the light diffusion device so that the light diffusion device does not substantially diffuse the light.

APPLICATION EXAMPLE 6

According to another aspect of the invention, in the projector, the receiving unit is able to communicate with an external network via wireless or wired connection, and the receiving unit receives the image projection command from the external network.

APPLICATION EXAMPLE 7

According to another aspect of the invention, the light diffusion device includes a PDLC device.

APPLICATION EXAMPLE 8

According to another aspect of the invention, the light diffusion device includes a focus-adjusting lens.

APPLICATION EXAMPLE 9

One aspect of the invention is directed to a projector including: a light source a spatial light modulation device which modulates light from the light source according to an image that is written; a light diffusion device which adjusts a degree of diffusion of the light incident on the spatial light modulation device or the light emitted from the spatial light modulation device; and a light diffusion controller which controls the light diffusion device so that the light diffusion device does not substantially diffuse the light when the light source starts to light up.

APPLICATION EXAMPLE 10

According to another aspect of the invention, the projector further includes a power receiving terminal, and the light source starts to light up when electric power starts to be supplied to the power receiving terminal.

APPLICATION EXAMPLE 11

According to another aspect of the invention, the projector further includes a display controller which writes an image for image projection into the spatial light modulation device when the light source starts to light up.

APPLICATION EXAMPLE 12

According to another aspect of the invention, the projector further includes a storage unit. When information indicating image projection is stored in the storage unit, the light diffusion controller controls the light diffusion device so that the light diffusion device does not substantially diffuse the light when the light source starts to light up, and when information indicating illumination projection is stored in the storage unit, the light diffusion controller controls the light diffusion device so that the light diffusion device diffuses the light when the light source starts to light up.

APPLICATION EXAMPLE 13

According to another aspect of the invention, the projector further includes a receiving unit which receives an illumination projection command, and in response to the reception of the illumination projection command by the receiving unit, the light diffusion controller controls the light diffusion device so that the light diffusion device diffuses the light.

APPLICATION EXAMPLE 14

According to another aspect of the invention, in the projector, the receiving unit is able to communicate with an external network via wireless or wired connection, and the receiving unit receives the illumination projection command from the external network.

APPLICATION EXAMPLE 15

According to another aspect of the invention, the light diffusion device includes a PDLC device.

APPLICATION EXAMPLE 16

According to another aspect of the invention, the light diffusion device includes a focus-adjusting lens.

APPLICATION EXAMPLE 17

One aspect of the invention is directed to a projector including: a light source; a spatial light modulation device which modulates light from the light source according to an image that is written; a light diffusion device which adjusts a degree of diffusion of the light incident on the spatial light modulation device or the light emitted from the spatial light modulation device; a light diffusion controller which controls the light diffusion device so that the light diffusion device does not substantially diffuse the light when the light source starts to light up; and a display controller which writes, into the spatial light modulation device, a UI image that allows selection of whether illumination projection is used or image projection is used when the light source starts to light up. The light diffusion controller controls the light diffusion device so that the light diffusion device diffuses the light when the illumination projection is selected, whereas the light diffusion device does not substantially diffuse the light when the image projection is selected.

APPLICATION EXAMPLE 18

According to another aspect of the invention, the light diffusion device includes a PDLC device.

APPLICATION EXAMPLE 19

According to another aspect of the invention, the light diffusion device includes a focus-adjusting lens.

APPLICATION EXAMPLE 20

One aspect of the invention is directed to a control method for a projector including a light source, a spatial light modulation device which modulates light from the light source according to an image that is written, and a light diffusion device which adjusts a degree of diffusion of the light incident on the spatial light modulation device or the light emitted from the spatial light modulation device. The method includes: starting to light up the light source; and controlling the light diffusion device so that the light diffusion device diffuses the light when the light source starts to be lit up.

APPLICATION EXAMPLE 21

One aspect of the invention is directed to a control method for a projector including a light source, a spatial light modulation device which modulates light from the light source according to an image that is written, and a light diffusion device which adjusts a degree of diffusion of the light incident on the spatial light modulation device or the light emitted from the spatial light modulation device. The method includes: starting to light up the light source; and controlling the light diffusion device so that the light diffusion device does not substantially diffuse the light when the light source starts to be lit up.

APPLICATION EXAMPLE 22

One aspect of the invention is directed to a control method for a projector including a light source, a spatial light modulation device which modulates light from the light source according to an image that is written, and a light diffusion device which adjusts a degree of diffusion of the light incident on the spatial light modulation device or the light emitted from the spatial light modulation device. The method includes: starting to light up the light source; controlling the light diffusion device so that the light diffusion device does not substantially diffuse the light when the light source starts to be lit up; writing, into the spatial light modulation device, a UI image that allows selection of whether illumination projection is used or image projection is used when the light source starts to be lit up; controlling the light diffusion device so as to diffuse the light when the illumination projection is selected; and controlling the light diffusion device so as not to substantially diffuse the light when the image projection is selected.

APPLICATION EXAMPLE 23

One aspect of the invention is directed to a projector including: a light source; a spatial light modulation device which modulates light from the light source according to an image that is written; a light diffusion device which adjusts a degree of diffusion of the light incident on the spatial light modulation device or the light emitted from the spatial light modulation device; a storage unit which stores information indicating illumination projection or information indicating image projection; and a light diffusion controller which controls the light diffusion device so that the light diffusion device diffuses the light when information indicating the illumination projection is stored in the storage unit, and which controls the light diffusion device so that the light diffusion device does not substantially diffuse the light when information indicating the image projection is stored in the storage unit.

APPLICATION EXAMPLE 24

According to another aspect of the invention, the projector further includes a display controller, the storage unit stores information indicating one of the illumination projection, the image projection, and UI image projection, the light diffusion controller controls the light diffusion device so that the light diffusion device does not substantially diffuse the light when information indicating the UI image projection is stored in the storage unit, the display controller writes, into the spatial light modulation device, a UI image that allows selection of whether the illumination projection is used or the image projection is used, when information indicating the UI image projection is stored in the storage unit.

According to the above aspects of the invention, the projector can function for illumination simply by being supplied with a main power source or by a startup operation. Therefore, it is convenient, for example, where illumination is suddenly needed when the user comes home in the evening or when the user is in bed at night. Also, according to the above aspects and embodiments, the projector can project a predetermined image simply by being supplied with a main power source or by a startup operation. Therefore, it is convenient particularly when the projector is used for a dedicated purpose such as projecting images like photographs and paintings every day. Also, according to the above aspects and embodiment, the user can store the selection of such an operation after the supply of a main power source or after a startup operation, in the projector in advance. Therefore, a projector which is highly convenient for a user who prefers both the illumination projection purpose and the image projection purpose can be provided.

BRIEF DESCRIPTION OF THE DRAWINGS

The invention will be described with reference to the accompanying drawings, wherein like numbers reference like elements.

FIG. 6A shows a normal mode. FIG. 6B shows a high-speed mode.

FIGS. 13A and 13B show a projector provided at a power feed terminal of an illumination device.

DESCRIPTION OF EXEMPLARY EMBODIMENTS

Embodiment 1
1. Overall Configuration of Projector

Figure 1:
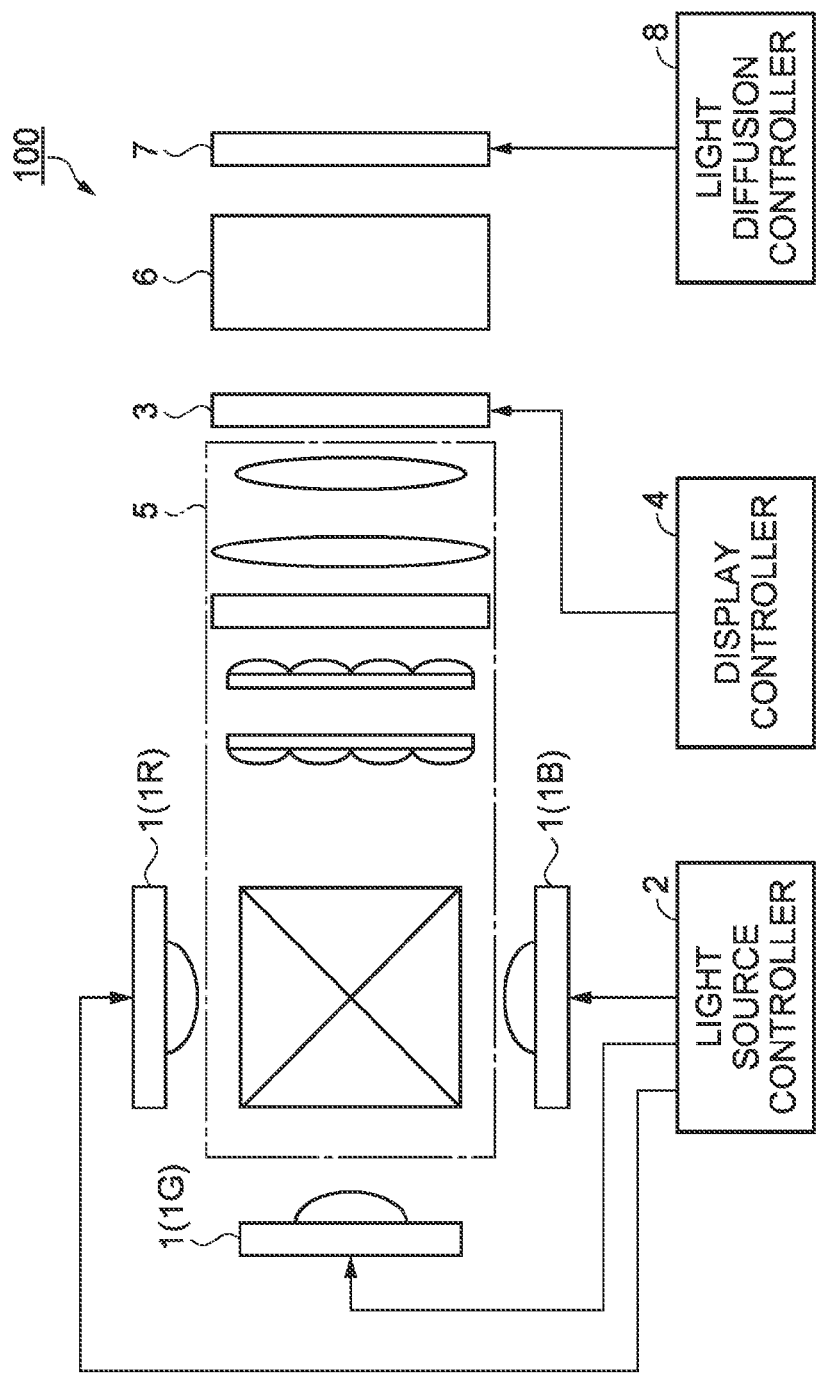
FIG. 1 is a schematic view of a projector according to an embodiment.

As shown in FIG. 1, a projector 100 includes a light source 1, a light source controller 2 which drives the light source 1, a spatial light modulation device 3 which modulates the light from the light source 1, a display controller 4 which writes an image into the spatial light modulation device 3, an irradiation system 5 provided to irradiate the spatial light modulation device 3 with the light from the light source 1, a projection system 6 which projects the light modulated by the spatial light modulation device 3, a light diffusion device 7 which adjusts the degree of diffusion of the light from the projection system 6, and a light diffusion controller 8 which controls the light diffusion device 7.

Figure 2:
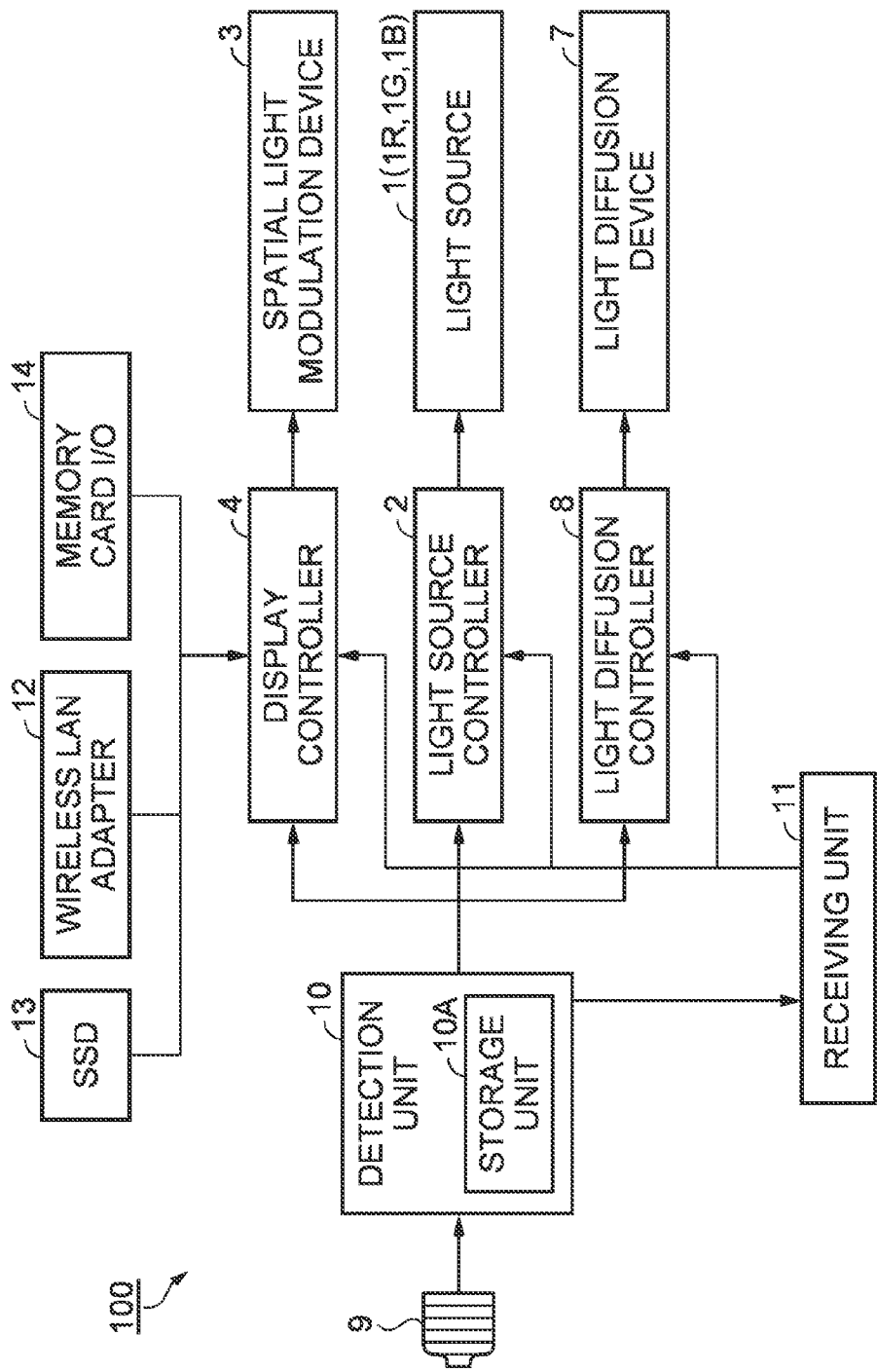
FIG. 2 is a functional block diagram of a projector according to an embodiment.

As shown in FIG. 2, the projector 100 further includes a power receiving terminal 9 which receives electric power for the projector 100 to function, from an external power source via a power feed terminal (not shown), and a detection unit 10 which detects that electric power is supplied to the power receiving terminal 9. The electric power supplied to the power receiving terminal 9 may be AC or DC power. The projector 100 also includes a receiving unit 11 which receives a command from a user.

The projector 100 has a wireless LAN adapter 12 as a kind of communication unit, and thus can receive a command to the projector 100 from an external network (not shown) and can also project an image stored in a storage unit of an external server computer, personal computer, smartphone or tablet computer, not shown. The projector 100 has an SSD (solid state drive) 13 including a flash drive, and a memory card I/O (input/output) circuit (including a card slot) 14.

In the SSD 13 or a memory card (not shown) inserted in the card slot, an image projected by the projector 100 is stored. The stored image can be rewritten via an external network by the function of the wireless LAN adapter 12.

In this description, an "image" is defined as a term including a still image and a dynamic image (moving picture). A still image includes an image that changes with time like a slide show and may have sounds or audio data. Also, an "image" may mean a still image or dynamic image itself that is displayed or projected, and may also mean data for displaying or projecting a still image or dynamic image (including streaming data).

The light source 1 has an LED corresponding to R (red light), an LED corresponding to G (green light) and an LED corresponding to B (blue light) and is also referred to as RGB light sources 1R, 1G, 1B hereinafter. R, G, B represent a typical exemplary combination of component colors to display full-color. Therefore, the light source 1 in this embodiment includes three LEDs corresponding to three different component colors, whereas in other embodiments, the light source may include LEDs corresponding to four or more different component colors or may include LEDs corresponding to two different component colors. The light source 1 may also include an organic or inorganic semiconductor laser or an organic EL (electroluminescence) element instead of LEDs, and may also include a phosphor using an LED or laser as an excitation light source.

The irradiation system 5 includes a dichroic prism which combines the optical paths of rays of the color light from the respective RGB light sources 1R, 1G, 1B, an integrator including a fly-eye lens, and a polarization conversion element which adjusts polarized lights of the light from the integrator into uniform light.

The spatial light modulation device 3 in this embodiment is a single-plate transmission-type liquid crystal light valve. The liquid crystal light valve referred to in this embodiment includes a pair of polarizers and a liquid crystal panel situated between the polarizers. As will be described in detail later, the RGB light sources 1R, 1G, 1B and the spatial light modulation device 3 are driven by an RGB sequential method, that is, a color sequential method. This enables the projector 100 to project full-color illumination or image.

The light diffusion device 7 is situated on the optical path of light projected by the projection system 6. The light diffusion device 7 includes a transmission-type reverse mode PDLC device. PDLC is a polymer dispersed liquid crystal. Although not shown, the reverse mode PDLC device includes a pair of light-transmissive electrodes and a reverse mode PDLC layer situated between the pair of electrodes.

If there is no electrical potential difference between the pair of electrodes, the reverse mode PDLC layer shows light transmissivity. Consequently, light is transmitted through the light diffusion device 7 without being substantially diffused. In this case, the light diffusion device 7 is described as being in a non-diffusion state.

Meanwhile, if a predetermined electrical potential difference is given between the pair of electrodes, the reverse mode PDLC layer shows light diffusibility. Consequently, light is diffused and transmitted through the light diffusion device 7. In this case, the light diffusion device 7 is described as being in a diffusion state.

Moreover, if the electrical potential difference given between the pair of electrodes is an intermediate value between 0 and the predetermined potential difference, the reverse mode PDLC layer shows intermediate light diffusibility corresponding to the potential. Consequently, the light is moderately diffused and transmitted through the light diffusion device 7. In this case, the light diffusion device 7 is described as being in an intermediate diffusion state.

In this manner, the light diffusion device 7 can adjust the degree of diffusion of an image or illumination projected by the projector 100.

The degree of transparency observed when the reverse mode PDCL layer shows light transmissivity is higher than the degree of transparency observed when a normal PDLC layer shows light transmissivity. This is an advantage of the light diffusion device 7 having the reverse mode PDLC layer (or a reverse mode PDLC device). The term "PDLC" is defined as including both "reverse mode PDLC" and normal "PDLC".

The power receiving terminal 9 in this embodiment is a metal cap. That is, the power receiving terminal 9 is structured to be screwed and fixed into a metal cap socket as an example of power feed terminal for an illumination device and receive the supply of electric power from the metal cap socket. The power receiving terminal 9 may also be a plug connected to an electric outlet as a power feed terminal.

The detection unit 10 detects that supply of electric power to the power receiving terminal 9 is started. The detection unit 10 also has a storage unit 10A. In the storage unit 10A, a flag (that is, information) to decide whether to start the projector 100 with illumination projection, or to start with image projection, or to project a UI image that allows the user to select illumination projection or projection light projection, when the supply of electric power to the power receiving terminal 9 is started, is stored in advance. The user can rewrite the flag by a command from an infrared remote controller (remote) or the like, or can rewrite the flag by a command from email via a network or from an application operating on a smartphone.

2. Operations of Projector

Operations of the projector 100 after electric power is supplied will be described with reference to FIGS. 3 to 5.

The projector 100 is provided in a metal cap socket where an illumination device is originally supposed to be provided. In this embodiment, a switch to supply the main power source to or shuts down the main power source from the projector 100 is a switch provided on a wall of a room. The switch is originally supposed to turn on and off the illumination apparatus.

As the switch is turned on, the supply of electric power to the power receiving terminal 9 starts (S1). That is, the supply of the main power source to the projector 100 starts. In this embodiment, the start of the supply of electric power or the main power source is equivalent to a change in the voltage of electric power to the power receiving terminal 9, from zero voltage to a voltage required for the projector 100 to project illumination or image. However, in other embodiments, it may be a change from a voltage that is insufficient for the projector 100 to project illumination or image to the required voltage.

As the supply of electric power to the power receiving terminal 9 starts, the detection unit 10 detects that the supply of electric power to the power receiving terminal 9 is started (S2). Then, the wireless LAN adapter 12 starts functioning and the display controller 4 and the receiving unit 11 become able to communicate bidirectionally with an external network via the wireless LAN adapter 12 (S3).

The detection unit 10 determines which one of illumination projection, image projection, and UI image projection is indicated by the flag stored in the storage unit 10A (S4).

2.1 Where Illumination Projection has Priority after Power is Turned On

Figure 3:
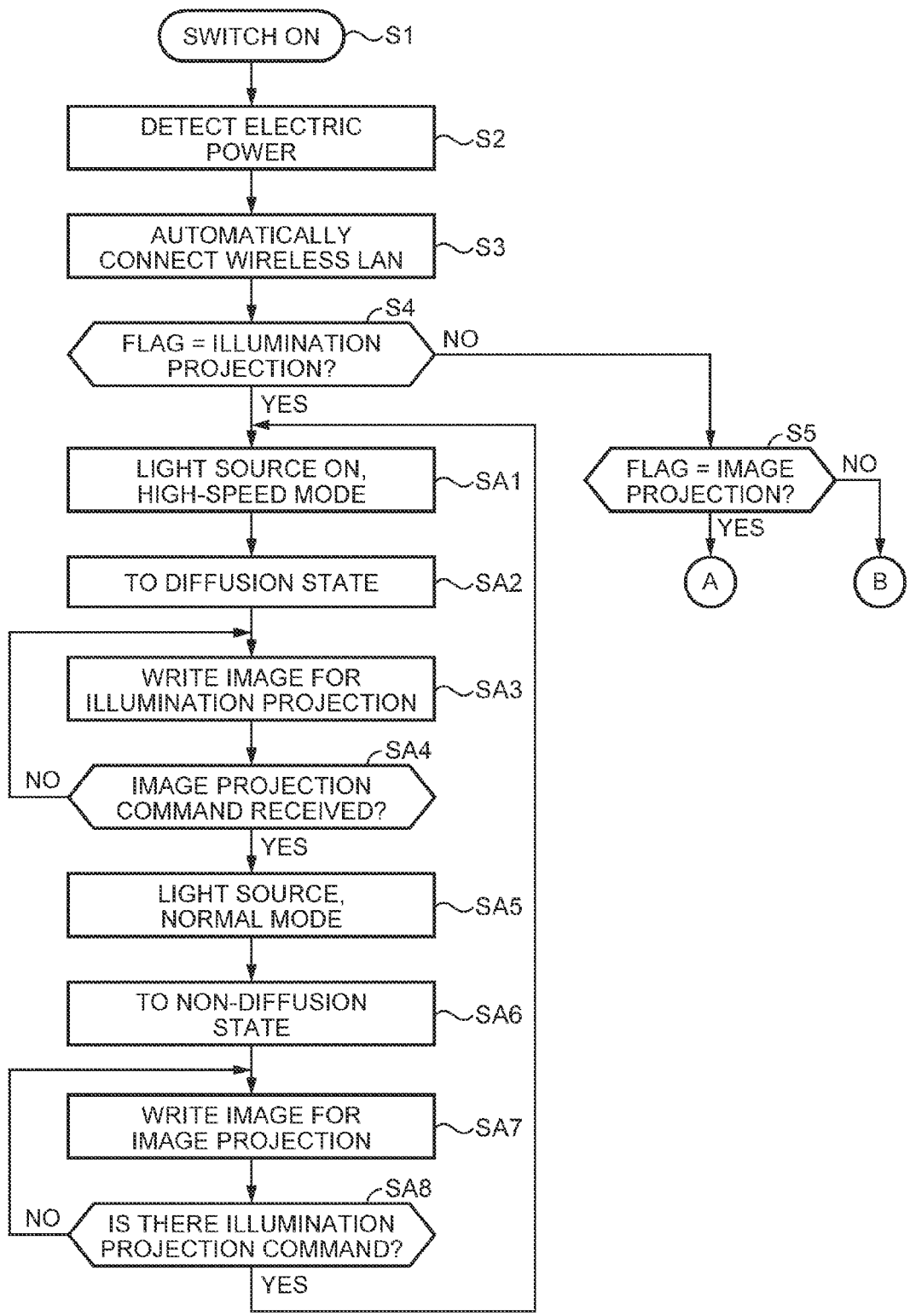
FIG. 3 is a flowchart showing an operation of a projector according to an embodiment.

As shown in FIG. 3, if the flag indicates illumination projection (S4: YES), processing goes as follows.

When the above detection (detection of the start of the supply of electric power: S2) is done by the detection unit 10, the light source controller 2 starts to light up the RGB light sources 1R, 1G, 1B. At this point, the light source controller 2 drives the RGB light sources 1R, 1G, 1B in a "high-speed mode", described later (SA1). Here, a trigger for the light source controller 2 to start to light up the RGB light sources 1R, 1G, 1B maybe the above detection by the detection unit 10, the start of the preceding step (in this case, the startup of the wireless LAN adapter 12), or the supply of electric power to the light source controller 2 itself. This equally applies to the start of the operation of the light diffusion controller 8 and the start of the operation of the display controller 4 in the following description.

When the above detection (S2) is done by the detection unit 10, the light diffusion controller 8 controls the light diffusion device 7 so that the light diffusion device 7 is in the diffusion state (SA2). In this case, since the light source 1 starts to light up as described above (SA1), it can be also described that the light diffusion device 7 diffuses light from the light source 1 when the light source 1 starts to light up. In this embodiment, since the light diffusion device 7 includes the reverse mode PDLC layer, a predetermined electrical potential difference is given between the pair of electrodes holding the reverse mode PDLC layer in-between. If the light diffusion device 7 includes a normal PDLC layer, the light diffusion controller 8 controls the light diffusion device 7 so that no electrical potential difference is given between the pair of electrodes (in this case, for example, the light diffusion device 7 needs to do nothing). This is because the diffusion state and the non-diffusion state that occur according to the presence or absence of an electrical potential difference are reversed between the reverse mode PDLC layer and the PDLC layer. The time when the light source 1 starts to light up and the time when the light diffusion device 7 starts diffusing light may be in random order or may be at the same time.

When the above detection (S2) is done by the detection unit 10, the display controller 4 writes an image for illumination projection into the spatial light modulation device 3 (SA3). The image for illumination projection typically has uniform luminance across the image. However, this image may have relatively higher or lower luminance in peripheral parts than in central parts. The image for illumination projection is stored in a non-volatile memory or ROM in a control unit 23, which will be described later with reference to FIG. 7. However, this image may also be stored in the SSD 13, a memory card, or a storage device on the network. The spatial light modulation device 3 modulates the lights from the RGB light sources 1R, 1G, 1B according to the image that is written. However, if the spatial light modulation device 3 includes a normally white (parallel nicol) liquid crystal light valve, the spatial light modulation device 3 uniformly transmits light even when the image is not written. Therefore, in this case, the display controller 4 does not have to write the image into the spatial light modulation device 3.

Through the above processing, the lights from the RGB light sources 1R, 1G, 1B pass through the spatial light modulation device 3 and the projection system 6 and are diffused by the light diffusion device 7. Consequently, the projector 100 projects illumination. While the expression of "project" illumination is used for convenience, a soft lamp suitable for indoor illumination or the like can be provided since the lights from the RGB light sources 1R, 1G, 1B are diffused by the light diffusion device 7. Therefore, the projector 100 can be used as an illumination apparatus.

While projecting illumination, the projector 100 waits for a command from the user (SA4: NO). If the user wants image projection, the user operates the remote controller to send an image projection command which designates projection of an image, to the projector 100. If the receiving unit 11 in the projector 100 receives the image projection command (SA4: YES), the light source controller 2 starts driving the RGB light sources 1R, 1G, 1B, switching from the high-speed mode to a normal mode in response to the reception (SA5). The light diffusion controller 8 controls the light diffusion device 7 so that the light diffusion device 7 enters the non-diffusion state (SA6). The display controller 4 writes an image for image projection into the spatial light modulation device 3 (SA7). This image is stored in the SSD 13, the memory card or the storage device on the network.

Through the above processing, the projector 100 switches from illumination projection to image projection. The projector 100 then waits for the next command from the user (SA8: NO). If the receiving unit 11 receives an illumination projection command, described later, in this state (SA8: YES), the processing returns to SA1.

2.2 Where Image Projection has Priority After Power is Turned On

If the flag stored in the storage unit 10A of the detection unit 10 does not indicate illumination projection (S4: NO), the detection unit 10 determines whether the flag indicates image projection or not (S5). If the flag indicates image projection (S5: YES), processing goes as follows.

Figure 4:
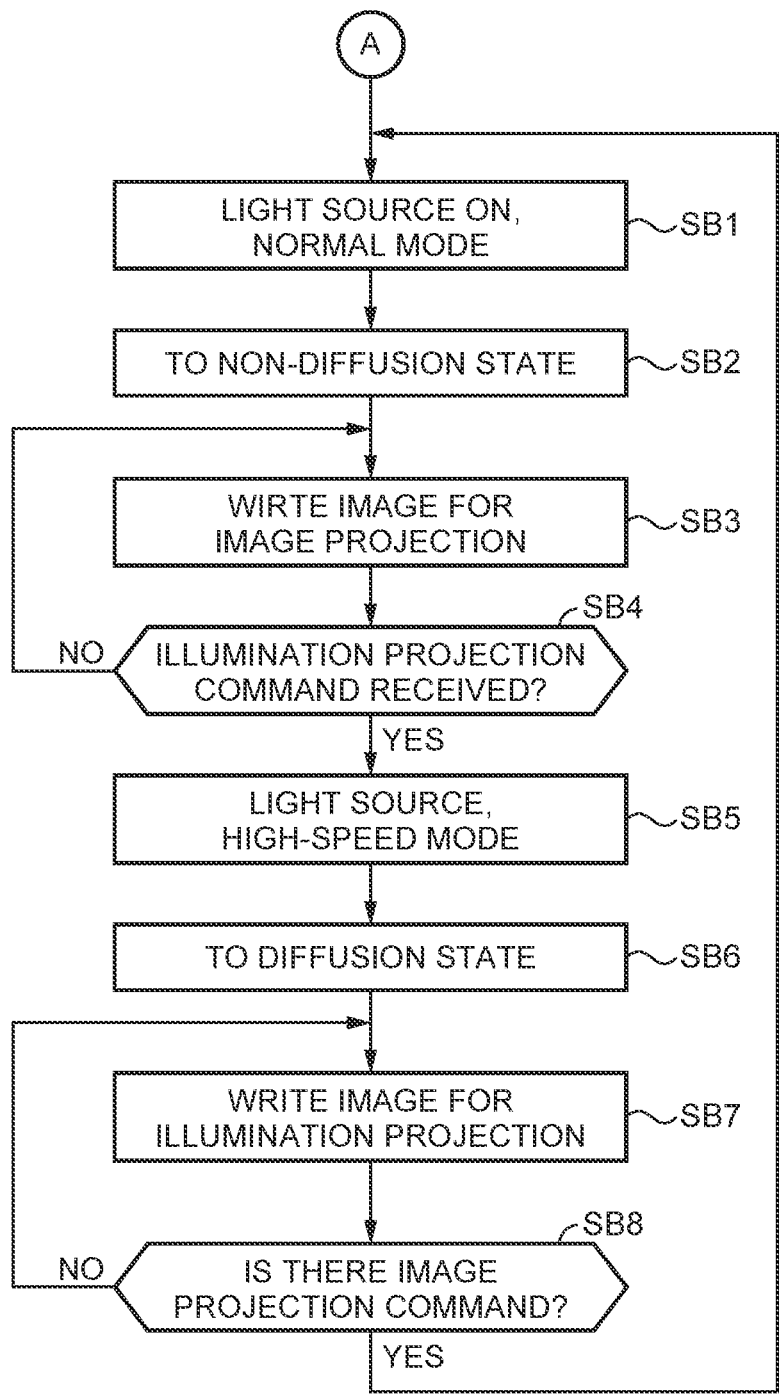
FIG. 4 is a flowchart showing an operation of a projector according to an embodiment.

As shown in FIG. 4, when the above detection (detection of the start of the supply of electric power supply: S2) is done by the detection unit 10, the light source controller 2 starts to light up the RGB light sources 1R, 1G, 1B. At this point, the light source controller 2 drives the RGB light sources 1R, 1G, 1B in the "normal mode", described later (SB1).

When the above detection (S2) is done by the detection unit 10, the light diffusion controller 8 controls the light diffusion device 7 so that the light diffusion device 7 is in the non-diffusion state (SB2). In this case, since the light source 1 starts to light up as described above (SB1), it can also be described that the light diffusion device 7 does not substantially diffuse light from the light source 1 when the light source 1 starts to light up. The time when the light source 1 starts to light up and the time when the light diffusion device 7 is set in the non-diffusion state may be in random order or may be at the same time.

When the above detection (S2) is done by the detection unit 10, the display controller 4 writes an image for image projection into the spatial light modulation device 3 (SB3).

Through the above processing, the lights from the RGB light sources 1R, 1G, 1B are modulated according to the image written in the spatial light modulation device 3 and are projected by the projection system 6. Here, since the light diffusion device 7 is in the non-diffusion state, the light modulated by the spatial light modulation device 3 is not substantially diffused. Consequently, a clear and/or bright image is projected. As the image projected here, not only a computer screen that provides information but also an image of a painting, a photograph or the like is effective. Also, software supporting an API (application program interface) for a photograph sharing site on the internet may be installed in the control unit 23 (described later) in the projector 100, and photographs having specific attribute information (for example, permission to use) can be automatically selected on the site and then projected.

While projecting the image, the projector 100 waits for a command from the user (SB4: NO). If the user wants illumination projection, the user operates the remote controller to send an illumination projection command which designates projection of illumination light, to the projector 100. If the receiving unit 11 in the projector 100 receives the illumination projection command (SB4: YES), the light source controller 2 starts driving the RGB light sources 1R, 1G, 1B, switching from the normal mode to the high-speed mode in response to the reception (SB5). The light diffusion controller 8 controls the light diffusion device 7 so that the light diffusion device 7 enters the diffusion state (SB6). The display controller 4 writes an image for illumination projection into the spatial light modulation device 3 (SB7).

Through the above processing, the projector 100 switches from image projection to illumination projection. The projector 100 then waits for the next command from the user (SB8: NO). If the receiving unit 11 receives an image projection command in this state (SB8: YES), the processing returns to SB1.

2.3 Where UI Image Projection has Priority after Power is Turned On

If the flag stored in the storage unit 10A of the detection unit 10 indicates UI image projection (S5: NO), processing goes as follows.

Figure 5:
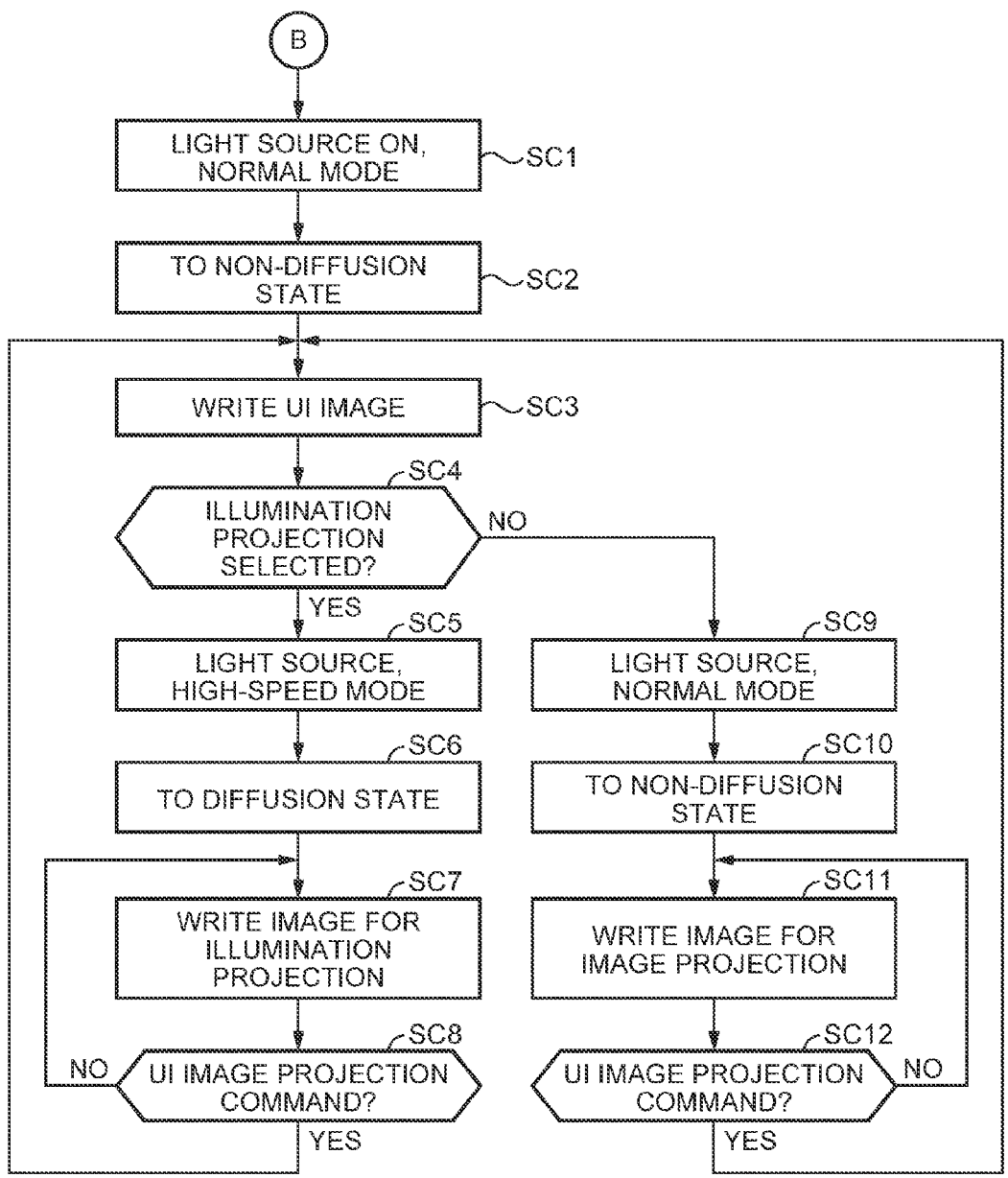
FIG. 5 is a flowchart showing an operation of a projector according to an embodiment.

As shown in FIG. 5, when the above detection (detection of the start of the supply of electric power: S2) is done by the detection unit 10, the light source controller 2 starts to light up the RGB light sources 1R, 1G, 1B. At this point, the light source controller 2 drives the RGB light sources 1R, 1G, 1B in the "normal mode", as will be described later.

When the above detection (S2) is done by the detection unit 10, the light diffusion controller 8 controls the light diffusion device 7 so that the light diffusion device 7 enters the non-diffusion state (SC2). In this case, since the light source 1 starts to light up as described above (SC1), it can also be described that the light diffusion device 7 stops substantially diffusing the light from the light source 1 when the light source 1 starts to light up. The time when the light source 1 starts to light up and the time when the light diffusion device 7 stops substantially diffusing the light may be in random order or may be at the same time.

When the above detection (S2) is done by the detection unit 10, the display controller 4 writes a UI image into the spatial light modulation device 3 (SC3). The spatial light modulation device 3 modulates the lights from the RGB light sources 1R, 1G, 1B according to the written image. The UI image is an interface for the user to select either illumination projection or image projection. The user can make this selection by operating the remote controller.

If illumination projection is selected on the UI image (SC4: YES), the light source controller 2 starts driving the RGB light sources 1R, 1G, 1B, switching from the "normal mode" to the "high-speed mode" (SC5). The light diffusion controller 8 controls the light diffusion device 7 so that the light diffusion device 7 enters the diffusion state (SC6). The display controller 4 writes an image for illumination projection into the spatial light modulation device 3 (SC7).

Through the above processing, the projector 100 switches from UI image projection to illumination projection. The projector 100 then waits for a UI image projection command to project a UI image again (SC8: NO). If a UI image projection command is received (SC8: YES), the processing returns to SC3. Although not shown in FIG. 5, if it is determined in SC8 that an illumination projection command and an image projection command are received other than a UI image projection command, the processing shifts to SA1 (FIG. 3) and SB1 (FIG. 4), respectively.

If image projection is selected on the UI Image (SC4: NO), the light source controller 2 starts driving the RGB light sources 1R, 1G, 1B in the "normal mode" (in this case, the normal mode is maintained from the state where the UI image is projected) (SC9). The light diffusion controller 8 controls the light diffusion device 7 so that the light diffusion device 7 is in the non-diffusion state (again, in this case, the non-diffusion state is maintained) (SC10). The display controller 4 writes an image for image projection into the spatial light modulation device 3 (SC11).

Through the above processing, the projector 100 switches from UI image projection to image projection. The projector 100 then waits for a UI image projection command from the user (SC12: NO). If a UI image projection command is received (SC12: YES), the processing returns to SC3. Although not shown in FIG. 5, if it is determined in SC12 that an illumination projection command and an image projection command are received other than a UI image projection command, the processing shifts to SA1 (FIG. 3) and SB1 (FIG. 4), respectively.

3. Drive Mode for RGB Light Sources
3.1 Normal Mode

Figure 6:
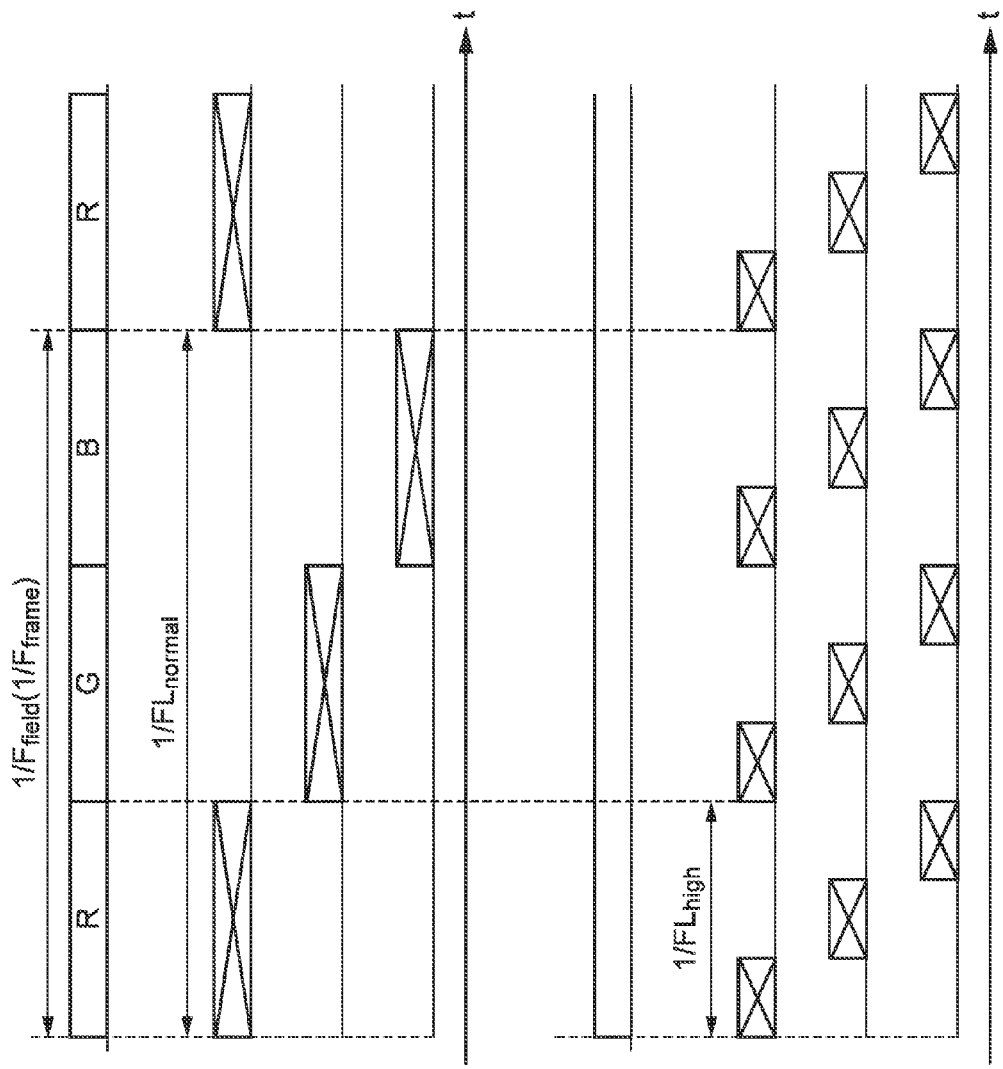
FIG. 6 is a timing chart illustrating a method for driving a light source of a projector according to an embodiment.

As shown in FIG. 6A, in RGB sequential driving or color sequential driving, one full-color frame is expressed by three field images that are consecutive in time. If double-speed driving is not available and a source image has a frame frequency $F_{frame}$ of 60 Hz, field images have an RGB repetition frequency $F_{field}$ of 60 Hz. Meanwhile, in the case of triple-speed driving, if a source image has a frame frequency $F_{frame}$ of 60 Hz, field images have an RGB repetition frequency $F_{field}$ of 180 Hz. If the RGB light sources 1R, 1G, 1B are driven in the normal mode, the R, G, B LEDs are sequentially driven, corresponding to the RGB field images. In this case, RGB light sources 1R, 1G, 1B have a repetition frequency $FL_{normal}$ of 60 Hz (in the case of triple-speed driving, 180 Hz). That is, in the normal mode, the RGB repetition frequency $F_{field}$ of the field images and the repetition frequency $FL_{normal}$ of the RGB light sources 1R, 1G, 1B that are sequentially driven are the same. The number of components colors and the number of component light sources may be greater than 3.

3.2 High-Speed Mode

As shown in FIG. 6B, in the case of the high-speed mode, the repetition frequency $FL_{high}$ of the RGB light sources 1R, 1G, 1B is higher than the RGB repetition frequency $F_{field}$ of the field images written in the spatial light modulation device 3 in the case of the normal mode.

Of course, when defining the normal mode and the high-speed mode, the two modes may be expressed by the levels of the repetition frequencies $FL_{normal}$ $FL_{high}$ of the RGB light sources 1R, 1G, 1B in the two modes. The repetition frequency $FL_{high}$ in the high-speed mode is higher than the repetition frequency $FL_{normal}$ in the normal mode, and in this embodiment, three times the repetition frequency $FL_{normal}$ in the normal mode.

In this embodiment, when the projector 100 carries out illumination projection, the RGB light sources 1R, 1G, 1B are driven in the high-speed mode and therefore color breaks are less perceptible than in the case of image projection. Also, in the case of illumination projection, since the time periods when the R, G, B LEDs can light up (lighting-available periods) do not overlap each other, there is no need to provided the same circuits in multiple numbers in a light source drive circuit 25 (FIG. 7) and the circuit configuration can be simplified. Also, since RGB sequential driving is carried out as in the case of image projection, drive control can be simplified. That is, an increase in cost can be prevented when providing the projector 100 that also functions as an illumination device.

In FIG. 6B, an image (image data) for illumination projection is written in the spatial light modulation device 3, along with the driving of the RGB light sources 1R, 1G, 1B in the high-speed mode. This image is, for example, an image expressed with uniform luminance distribution. The written image need not particularly be refreshed in the spatial light modulation device 3 as shown in FIG. 6B, but the image may be refreshed. If the image is refreshed, the written image may have luminance distribution that changes with time. It is preferable that the timing of refreshing is set to one of the switching points between the lighting-available periods of the respective RGB light sources 1R, 1G, 1B, because fewer visual beats tend to occur. However, a lower frequency of refreshing is preferred because power consumption is reduced. Thus, for example, it is possible to refresh the written image at a lower frequency than the repetition frequency of the RGB light sources 1R, 1G, 1B.

However, if the spatial light modulation device 3 includes a normally white (parallel nicol) liquid crystal light valve, each pixel area of the spatial light modulation device 3 transmits light even if an image (image data) is not written. Therefore, in this case, when the RGB light sources 1R, 1G, 1B are driven in the high-speed mode, the display controller 4 does not have to write an image in the spatial light modulation device 3.

The color of light projected in the case of the high-speed mode can be changed by changing the light emission intensity ratio among the RGB light sources 1R, 1G, 1B. The color of this light can also be changed by changing the pulse width (lighting period width) within the lighting-available periods of the respective RGB light sources 1R, 1G, 1B.

4. Hardware Configuration

Figure 7:
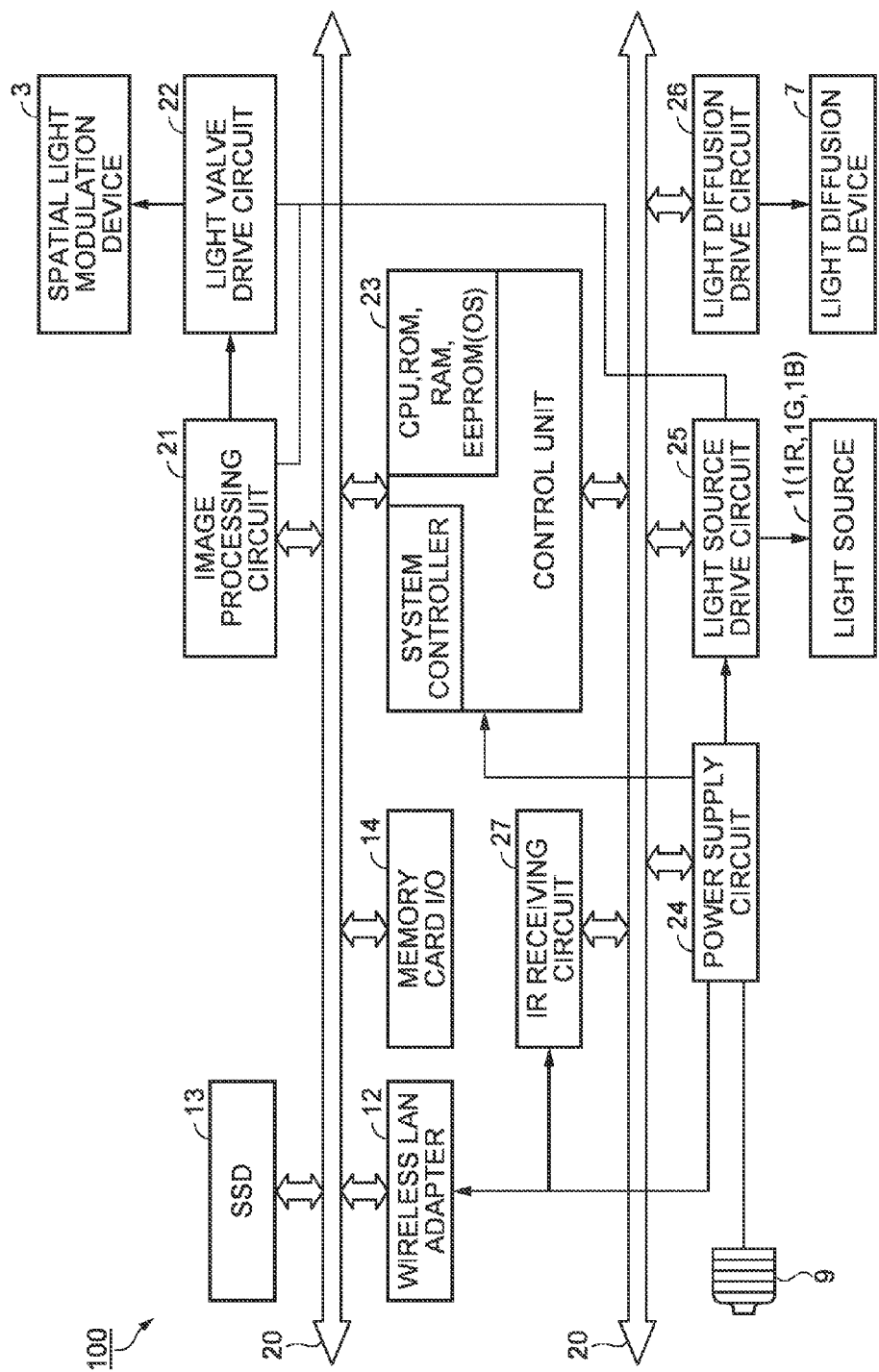
FIG. 7 is a schematic view showing the hardware configuration of a projector according to an embodiment.

Referring to FIG. 7, the projector 100 will be described in terms of a more specific hardware configuration. However, in some cases, the components that are already described are denoted by the same reference numerals in the drawings and will not be described further in detail.

The projector 100 includes a bus 20, an image processing circuit 21 which carries out resolution conversion, color correction and keystone correction on a source image, a light valve drive circuit 22 which gives a drive signal to the spatial light modulation device 3 based on the image processed by the image processing circuit 21, a control unit 23, a power supply circuit 24 electrically connected to the power receiving terminal 9, a light source drive circuit 25 which gives a drive signal to the RGB light sources 1R, 1G, 1B, a light diffusion drive circuit 26 which gives a drive signal to the light diffusion device 7, and an IR receiving circuit 27 which receives an infrared command from the remote controller. These components can communicate with each other via the bus 20 under the control of the control unit 23.

The control unit 23 has a system controller, a non-volatile memory including a flash memory, a ROM, a RAM, and a CPU. In the non-volatile memory, operating software and application software to realize the functions described in this embodiment are stored. A BIOS is stored in the ROM. Also, an image for illumination projection is stored in the non-volatile memory or ROM.

The detection unit 10 is realized by the control unit 23 and the power supply circuit 24. The light source controller 2 is realized by the control unit 23 and the light source drive circuit 25. The display controller 4 is realized by the control unit 23, the image processing circuit 21 and the light valve drive circuit 22. The light diffusion controller 8 is realized by the control unit 23 and the light diffusion drive circuit 26. The receiving unit 11 is realized by the control unit 23 and the IR receiving circuit 27 and/or the wireless LAN adapter 12. However, the configurations of the detection unit 10, the light source controller 2, the display controller 4, the light diffusion controller 8 and the receiving unit 11 are not limited to the hardware configurations according to this embodiment and can include other equivalent configurations that achieve similar functions. These components can also be realized by dedicated hardware for each component.

5. "Illumination Projection" and "Image Projection"

"Illumination projection" by its broadest definition refers to the state where the projector 100 performs the function of providing a "lamp" indoors or outdoors as an illumination device. For example, "illumination projection" is the state where an image for illumination projection is projected on a target projection surface. "Illumination projection" may also be defined as the state where the light diffusion device 7 is in the diffusion state. Alternatively, it may be defined as the state where the RGB light sources 1R, 1G, 1B are driven in the high-speed mode. "Illumination projection" may be any state where at least one of the above three conditions is satisfied. Therefore, in some cases, even when the projector 100 is projecting a painting, photograph, dynamic image or computer screen, if the light diffusion device 7 is in the diffusion state or if the RGB light sources 1R, 1G, 1B are driven in the high-speed mode, the projector 100 may be described as performing "illumination projection".

"Image projection" by its broadest definition refers to the state where the projector 100 is projecting a certain kind of image. "Image projection" may also be defined as the state where the light diffusion device 7 is in the non-diffusion state. Alternatively, it may be defined as the state where the RGB light sources 1R, 1G, 1B are driven in the normal mode. The case where the light diffusion device 7 is in the intermediate diffusion state may be included in image projection.

Embodiment 2

By modifying the detection unit 10 and the power supply circuit 24 included therein in Embodiment 1, it is possible to make the projector 100 enter a standby mode when electric power is supplied to the power receiving terminal 9. According to Embodiment 2, if the receiving unit 11 receives a startup command from the user when the projector 100 thus modified is in the standby mode, the following processing shown in FIGS. 8 to 10 starts.

As in Embodiment 1, as the switch on the wall is turned on, electric power is supplied to the power receiving terminal 9 (T0). That is, a main power source is supplied to the projector 100. Thus, the projector 100 enters the standby mode (T1). However, at this point, the power supply circuit 24 (FIG. 7) starts supplying electric power to the receiving unit 11 and consequently the receiving unit 11 waits for reception of a startup command. In this embodiment, a startup command is a command sent from an infrared remote controller but may be a startup command sent via an external network from a network device such as smartphone. In the standby mode, configurations that are necessary for receiving a startup command and for starting subsequent processing (described later) in response to the reception are started in the projector 100. Also, to receive a startup command from an external network, electric power may be supplied to the wireless LAN adapter 12 so that the wireless LAN adapter 12 can function in the standby mode. As described above, in this description, the receiving unit 11 is defined as including the wireless LAN adapter 12.

As the user sends a startup command to the projector 100, the receiving unit 11 receives the startup command (T2). In this embodiment, the wireless LAN adapter 12 starts functioning at this stage and the display controller 4 and the receiving unit 11 are enabled to communicate bidirectionally with the external network via the wireless LAN adapter 12 (T3).

The detection unit 10 then determines which one of illumination projection, image projection and UI image projection is indicated by the flag stored in the storage unit 10A.

Figure 8:
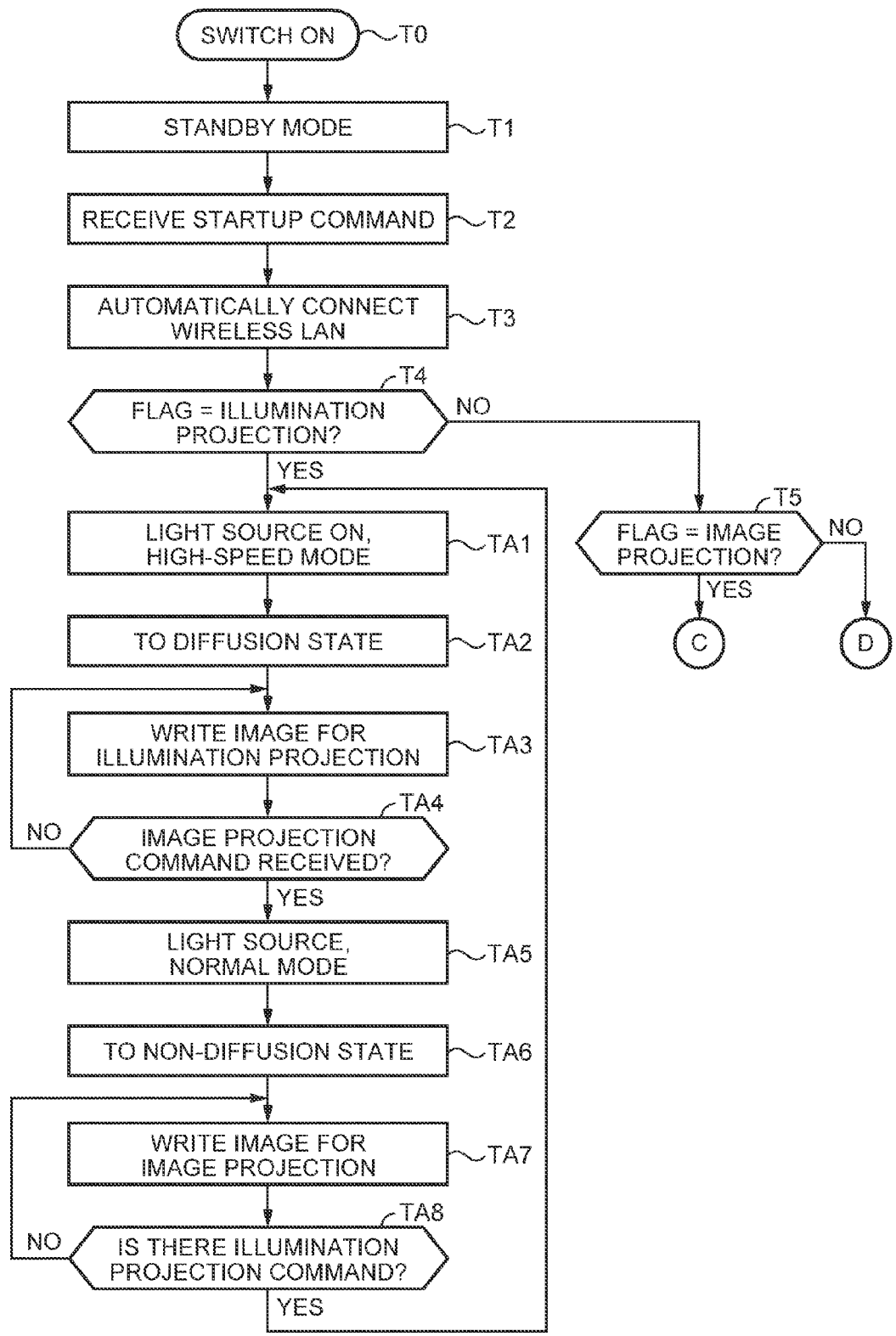
FIG. 8 is a flowchart showing an operation of a projector according to an embodiment.

A. Where Illumination Projection has Priority After Startup Command is Received As shown in FIG. 8, if the flag indicates illumination projection (T4: YES), processing goes as follows.

When the receiving unit 11 receives a startup command, the light source controller 2 starts to light up the RGB light sources 1R, 1G, 1B. At this point, the light source controller 2 drives the RGB light sources 1R, 1G, 1B in the high-speed mode (TA1). Here, a trigger for the light source controller 2 to start to light up the RGB light sources 1R, 1G, 1B may be the reception of the startup command by the receiving unit 11, the start of the preceding step (in this case, the startup of the wireless LAN adapter 12), or the supply of electric power to the light source controller 2 itself. This equally applies to the start of the operation of the light diffusion controller 8 and the start of the operation of the display controller 4 in the following description.

When the startup command is received by the receiving unit 11, the light diffusion controller 8 controls the light diffusion device 7 so that the light diffusion device 7 is in the diffusion state (TA2).

When the startup command is received by the receiving unit 11, the display controller 4 writes an image for illumination projection into the spatial light modulation device 3 (TA3). However, if the spatial light modulation device 3 includes a normally white (parallel nicol) liquid crystal light valve, the spatial light modulation device 3 uniformly transmits light even when an image is not written. Therefore, in this case, the display controller 4 does not have to write an image into the spatial light modulation device 3.

Through the above processing, the lights from the RGB light sources 1R, 1G, 1B pass through the spatial light modulation device 3 and the projection system 6 and diffused by the light diffusion device 7. Consequently, the projector 100 projects illumination.

While projecting illumination, the projector 100 waits for a command from the user (TA4: NO). If the user wants image projection, the user operates the remote controller to send an image projection command to the projector 100. If the receiving unit 11 in the projector 100 receives the image projection command (TA4: YES), the light source controller 2 starts driving the RGB light sources 1R, 1G, 1B, switching from the high-speed mode to the normal mode in response to the reception (TA5). The light diffusion controller 8 controls the light diffusion device 7 so that the light diffusion device enters the non-diffusion state (TA6). The display controller 4 writes an image into the spatial light modulation device 3 (TA7). This image is stored in the SSD 13, the memory card or the storage device on the network.

Through the above processing, the projector 100 switches from illumination projection to image projection. The projector 100 then waits for the next command from the user (TA8: NO). If the receiving unit 11 receives an illumination projection command in this state (TA8: YES), the processing returns to TA1.

B. Where Image Projection has Priority After Startup Command is Received

If the flag stored in the storage unit 10A of the detection unit 10 does not indicate illumination projection (T4: NO), the detection unit 10 determines whether the flag indicates image projection or not (T5). If the flag indicates image projection (T5: YES), processing goes as follows.

Figure 9:
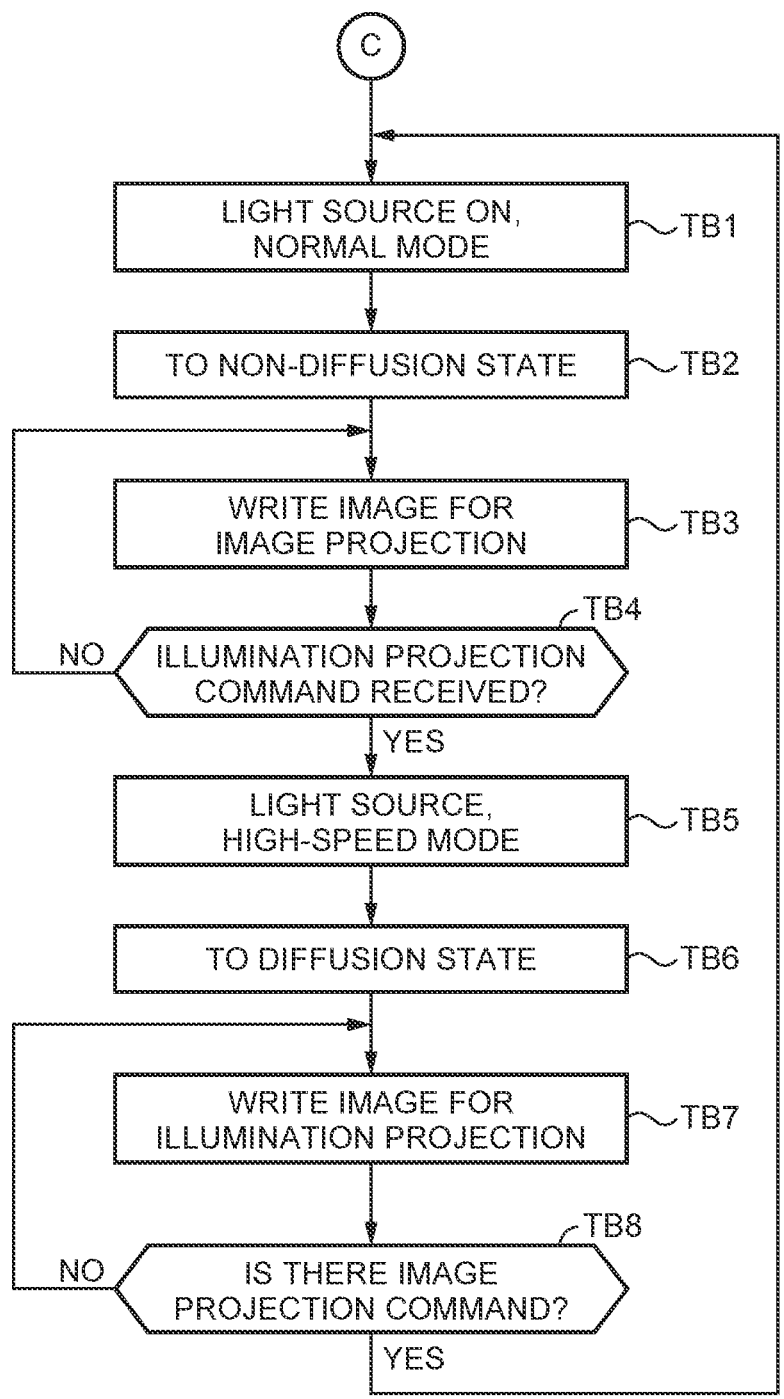
FIG. 9 is a flowchart showing an operation of a projector according to an embodiment.

As shown in FIG. 9, when the startup command is received by the receiving unit 11, the light source controller 2 starts to light up the RGB light sources 1R, 1G, 1B. At this point, the light source controller 2 drives the RGB light sources 1R, 1G, 1B in the normal mode (TB1).

When the startup command is received by the receiving unit 11, the light diffusion controller 8 controls the light diffusion device 7 so that light diffusion device 7 is in the non-diffusion state (TB2).

When the startup command is received by the receiving unit 11, the display controller 4 writes an image for image projection into the spatial light modulation device 3 (TB3).

Through the above processing, the lights from the RGB light sources 1R, 1G, 1B are modulated according to the image written in the spatial light modulation device 3 and are projected by the projection system 6.

While projecting the image, the projector 100 waits for a command from the user (TB4: NO). If the user wants illumination projection, the user operates the remote controller to send an illumination projection command to the projector 100. If the receiving unit 11 in the projector 100 receives the illumination projection command (TB4: YES), the light source controller 2 starts driving the RGB light sources 1R, 1G, 1B, switching from the normal mode to the high-speed mode in response to the reception (TB5). The light diffusion controller 8 controls the light diffusion device 7 so that the light diffusion device 7 enters the diffusion state (TB6). The display controller 4 writes an image for illumination projection into the spatial light modulation device 3 (TB7).

Through the above processing, the projector 100 switches from image projection to illumination projection. The projector 100 then waits for the next command from the user (TB8: NO). If the receiving unit 11 receives an image projection command in this state (TB8: YES), the processing returns to TB1.

C. Where UI Image Projection has Priority After Startup Command is Received

If the flag stored in the storage unit 10A of the detection unit 10 indicates UI image projection (T5: NO), processing goes as follows.

Figure 10:
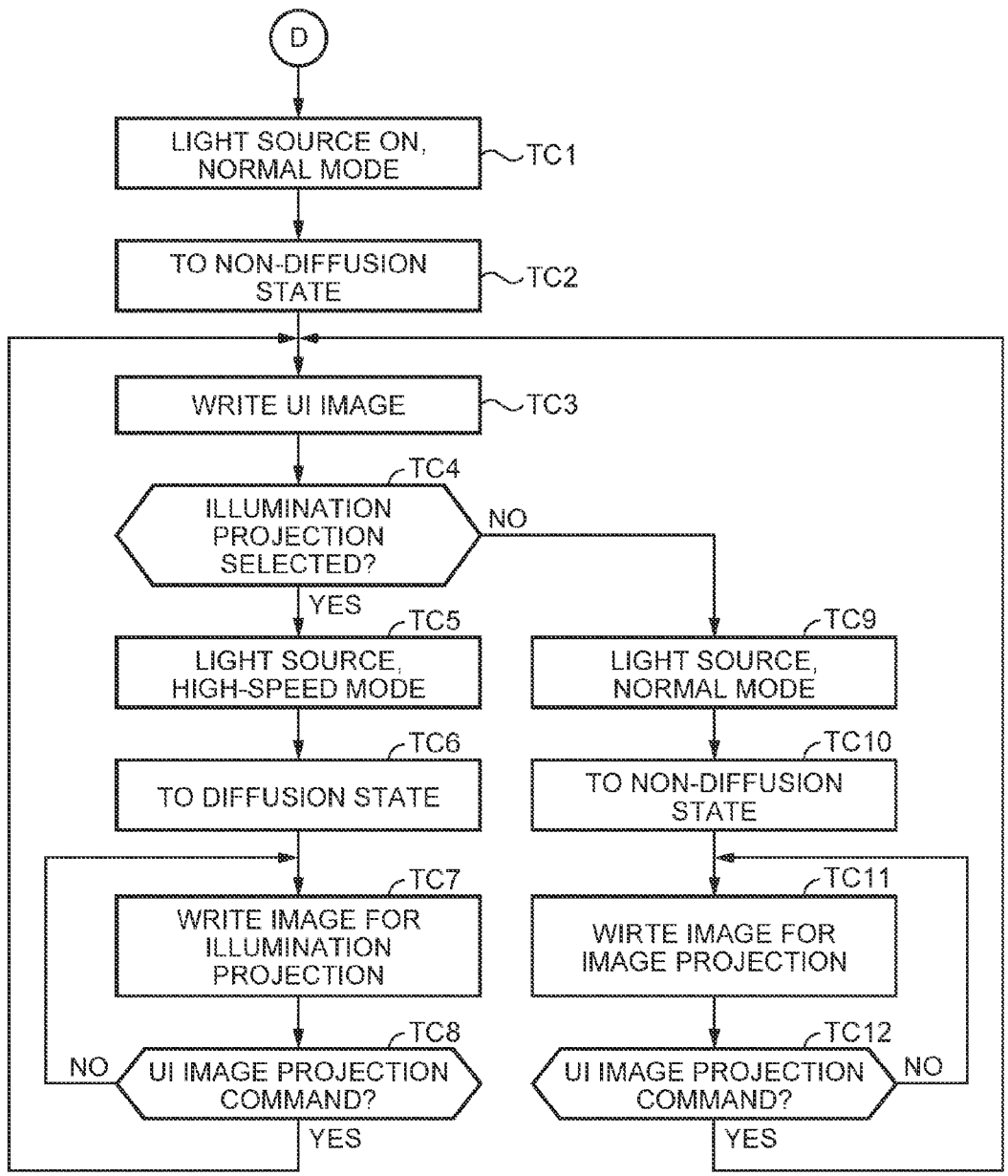
FIG. 10 is a flowchart showing an operation of a projector according to an embodiment.

As shown in FIG. 10, when the startup command is received by the receiving unit 11, the light source controller 2 starts to light up the RGB light sources 1R, 1G, 1B. At this point, the light source controller 2 drives the RGB light sources 1R, 1G, 1B in the normal mode (TC1).

When the startup command is received by the receiving unit 11, the light diffusion controller 8 controls the light diffusion device 7 so that the light diffusion device 7 is in the non-diffusion state (TC2).

When the startup command is received by the receiving unit 11, the display controller 4 writes a UI image into the spatial light modulation device 3 (TC3).

If illumination projection is selected on the UI image (TC4: YES), the light source controller 2 starts driving the RGB light sources 1R, 1G, 1B, switching from the "normal mode" to the "high-speed mode" (TC5). The light diffusion controller 8 controls the light diffusion device 7 so that the light diffusion device 7 enters the diffusion state (TC6). The display controller 4 writes an image for illumination projection into the spatial light modulation device 3 (TC7).

Through the above processing, the projector 100 switches from UI image projection to illumination projection. The projector 100 then waits for a UI image projection command from the user (TC8: NO). If a UI image projection command is received (TC8: YES), the processing returns to TC3. Although not shown in FIG. 10, if it is determined in TC8 that an illumination projection command and an image projection command are received other than a UI image projection command, the processing shifts to TA1 (FIG. 8) and TB1 (FIG. 9), respectively.

If image projection is selected on the UI image (TC4: NO), the light source controller 2 starts driving the RGB light sources 1R, 1G, 1B in the "normal mode" (in this case, the normal mode is maintained from the state where the UI image is projected) (TC9). The light diffusion controller 8 controls the light diffusion device 7 so that the light diffusion device 7 enters the non-diffusion state (again, in this case, the non-diffusion state is maintained) (TC10). The display controller 4 writes an image for image projection into the spatial light modulation device 3 (TC11).

Through the above processing, the projector 100 switches from UI image projection to image projection. The projector 100 then waits for a UI image projection command from the user (TC12: NO). If a UI image projection command is received (TC12: YES), the processing returns to TC3. Although not shown in FIG. 10, if it is determined in TC12 that an illumination projection command and an image projection command are received other than a UI image projection command, the processing shifts to TA1 (FIG. 8) and TB1 (FIG. 9), respectively.

Modification 1

The light diffusion device 7 may be either a device utilizing a diffusion plate or a device utilizing a focus-adjusting lens, other than the PDLC device, and may be a combination of some of these three devices.

Figures 11A, 11B:
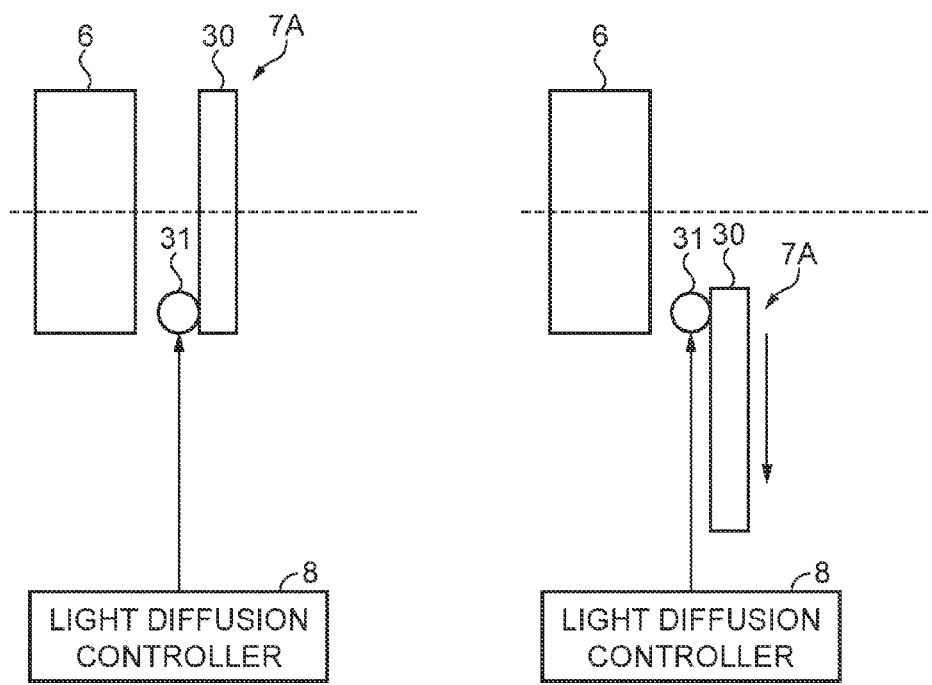
FIGS. 11A and 11B are schematic views showing the case where a light diffusion device of an embodiment has a diffusion plate.

As shown in FIGS. 11A and 11B, in the case where a diffusion plate 30 is used, a light diffusion device 7A has a diffusion plate 30 which diffuses and transmits light, and a mechanical mechanism 31 which slides the diffusion plate 30 so that the diffusion plate 30 is inserted in an optical path of the projector 100 or removed out of the optical path. The position where the diffusion plate 30 is inserted may be anywhere on the optical path and may be on the optical path between the spatial light modulation device 3 and the RGB light sources 1R, 1G, 1B. This equally applies to the case where a reverse mode PDLC device is used and the case where a PDLC device is used. That is, the light diffusion device 7A may diffuse either one of the light incident on the spatial light modulation device 3 and the light emitted from the spatial light modulation device 3. However, a position that is outer than the outermost projection lens is preferable because it enables efficient utilization of the lights from the RGB light sources 1R, 1G, 1B in the case of illumination projection.

The diffusion plate 30 may be wheel-shaped. In this case, the diffusion plate 30 may include a portion which diffuses light (a portion with a degree of diffusion), a portion which transmits light without substantially diffusing the light (a portion with a low degree of diffusion), and a portion with an intermediate degree of diffusion. As the mechanism 31 rotates the wheel under the control of the light diffusion controller 8, one of the three portions is situated on the optical path of the projector 100.

Figure 12:
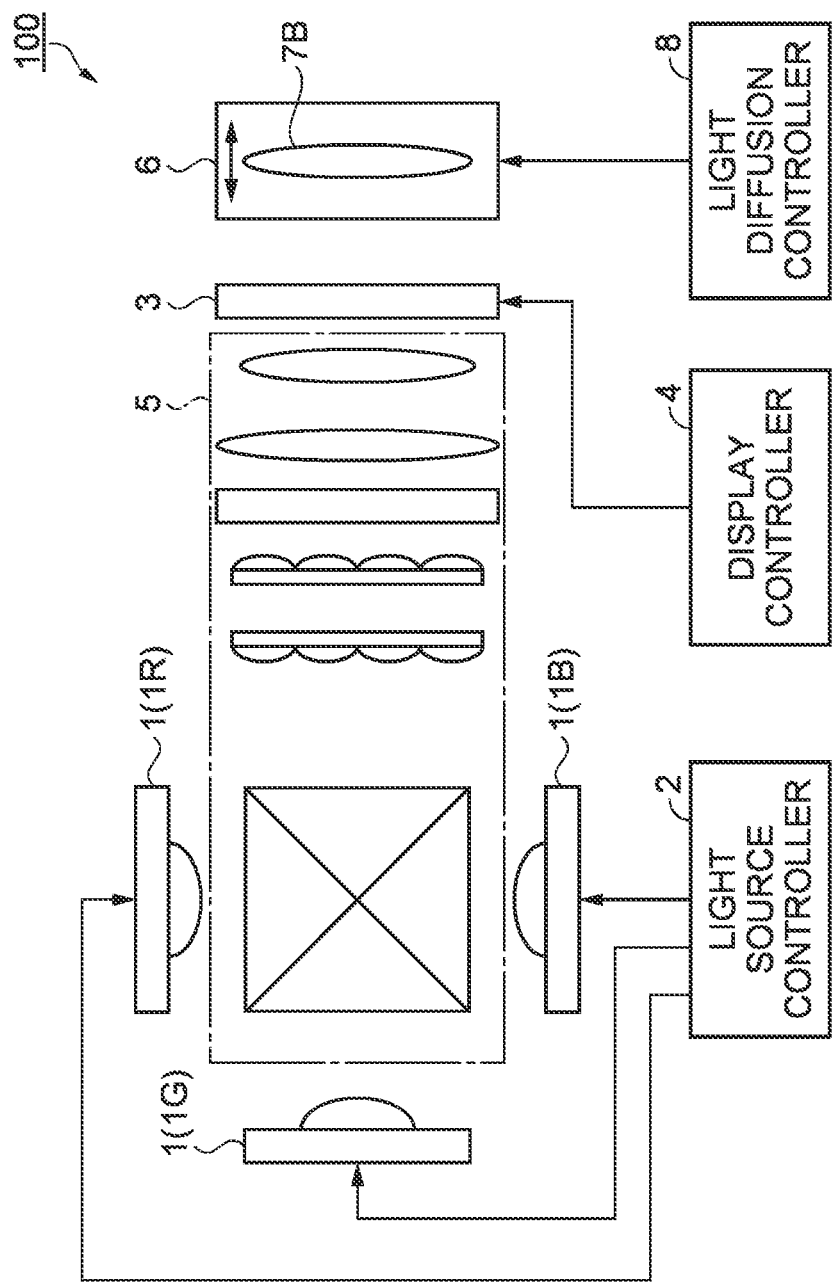
FIG. 12 is a schematic view showing the case where a light diffusion device of an embodiment has a focus-adjusting lens.

As shown in FIG. 12, in the case where a focus-adjusting lens (focusing lens) is used, a light diffusion device 7B has a focusing lens included in the projection system 6, and a mechanism which displaces the position of the focusing lens on the optical path.

In the case of illumination projection, the light diffusion controller 8 drives the light diffusion device 7B so that projected light is defocused on a target projection surface (for example, a screen, wall, table top, or ceiling). Consequently, the light from the projector 100 is diffused on the target projection surface.

In the case of image projection, the light diffusion controller 8 drives the light diffusion device 7B so that projected light is focused on the target projection surface. Consequently, the light from the projector 100 is not substantially diffused on the target projection surface.

The light diffusion controller 8 may measure the distance from the target projection surface and then adjust the focus of projected light, every time image projection is started. Alternatively, instead of measuring the distance each time, the light diffusion controller 8 may store the position of the lens that is once adjusted to focus and then control the focusing lens so that the focusing lens is situated at the stored position in accordance with the switching from illumination projection to image projection.

Modification 2: Remote Controller

The remote controller used by the user is used not only to switch between illumination projection and image projection but also to select and write a flag that decides which one of illumination projection, image projection and UI image projection should be started, immediately after the projector 100 starts to be supplied with the power source.

The transmission of a command includes command transmission via an infrared remote controller, command transmission via email, and command transmission from a dedicated application functioning on a smartphone or tablet computer. The latter two cases are effective when the projector 100 is connected to a network via a wireless LAN or PLC (power line carrier communication). Therefore, the remote controller can be a personal computer, a mobile phone including smartphone, and a tablet computer, as well as an IR remote controller.

Modification 3: Spatial Light Modulation Device

According to the embodiments, the spatial light modulation device 3 is a single-plate transmission-type liquid crystal light valve. However, the spatial light modulation device 3 may also include a reflection-type liquid crystal light valve and may include a digital mirror device (DMD). If the spatial light modulation device 3 includes a reflection-type liquid crystal light valve, a digital mirror device or another type of light valve, how the irradiation system 5 and the projection system 6 should be modified is obvious to a person skilled in the art.

Modification 4

According to Embodiments 1 and 2, a flag (information) indicating which one of illumination projection, image projection and UI image projection should have priority is stored in the storage unit 10A of the detection unit 10, and when the supply of the main power source is started or a startup command is received, the detection unit 10 determines which flag is stored, and one of illumination projection, image projection and UI image projection is started according to the determination (S4, S5, T4 and T5 in FIGS. 3 and 5). However, the invention is not limited to such embodiments. The projector 100 may be configured to start one of illumination projection, image projection and UI image projection without determining the flag, when the supply of the main power source is started or a startup command is received. For example, the projector 100 may be configured to start illumination projection without the determination when the main power source is supplied or a startup command is received.

Effective Use of Projector of Embodiments

According to the embodiments, the light diffusion device 7 can cyclically repeat shifts between the diffusion state and the non-diffusion state. Such cyclical repetitions can realize an effect that makes the illumination appealing. In this case, the projector 100 projects an image for illumination projection when the light diffusion device 7 diffuses light, and the projector 100 projects an image for image projection when the light diffusion device 7 does not substantially diffuse light. Alternatively, the projector 100 may project an image based on image data, whether the light diffusion device 7 diffuses light or not.

What is claimed is:

1. A projector comprising:
    a light source;
    a spatial light modulation device which modulates light from the light source according to an image that is written;
    a light diffusion device which adjusts a degree of diffusion of the light incident on the spatial light modulation device or the light emitted from the spatial light modulation device,
    the light diffusion device being switched at least between a diffusion state in which the light diffusion device diffuses the light and a non-diffusion state in which the light diffusion device does not substantially diffuse the light; and
    a light diffusion controller which controls the light diffusion device such that when the projector operates as an illumination device, the light diffusion device is in the diffusion state, whereas when the projector operates as an image projection device, the light diffusion device is in the non-diffusion state,
    wherein when the light source starts to light up, the light diffusion controller controls the light diffusion device so that the light diffusion device is in the diffusion state and the projector starts to operate as the illumination device.

2. The projector according to claim 1, further comprising a power receiving terminal,
 wherein the light source starts to light up when electric power starts to be supplied to the power receiving terminal.

3. The projector according to claim 1, further comprising a display controller which writes an image for illumination projection into the spatial light modulation device when the light source starts to light up.

4. The projector according to claim 1, further comprising a storage unit,
 wherein when information indicating illumination projection is stored in the storage unit, the light diffusion controller controls the light diffusion device so that the light diffusion device is in the diffusion state when the light source starts to light up, and
 when information indicating image projection is stored in the storage unit, the light diffusion controller controls the light diffusion device so that the light diffusion device is in the non-diffusion state when the light source starts to light up.

5. The projector according to claim 1, further comprising a receiving unit which receives an image projection command,
 wherein in response to the reception of the image projection command by the receiving unit, the light diffusion controller controls the light diffusion device so that the light diffusion device is in the non-diffusion state.

6. The projector according to claim 5, wherein
 the receiving unit is able to communicate with an external network via wireless or wired connection, and
 the receiving unit receives the image projection command from the external network.

7. The projector according to claim 1, wherein the light diffusion device includes a PDLC device.

8. The projector according to claim 1, wherein the light diffusion device includes a focus-adjusting lens.

9. A projector comprising:
 a light source;
 a spatial light modulation device which modulates light from the light source according to an image that is written;
 a light diffusion device which adjusts a degree of diffusion of the light incident on the spatial light modulation device or the light emitted from the spatial light modulation device,
 the light diffusion device being switched at least between a diffusion state in which the light diffusion device diffuses the light and a non-diffusion state in which the light diffusion device does not substantially diffuse the light; and
 a light diffusion controller which controls the light diffusion device such that when the projector operates as an illumination device, the light diffusion device is in the diffusion state, whereas when the projector operates as an image projection device, the light diffusion device is in the non-diffusion state,
 wherein when the light source starts to light up, the light diffusion controller controls the light diffusion device so that the light diffusion device is in the non-diffusion state and the projector starts to operate as the image projection device.

10. The projector according to claim 9, further comprising a power receiving terminal,
 wherein the light source starts to light up when electric power starts to be supplied to the power receiving terminal.

11. The projector according to claim 9, further comprising a display controller which writes an image for image projection into the spatial light modulation device when the light source starts to light up.

12. The projector according to claim 9, further comprising a storage unit,
 wherein when information indicating image projection is stored in the storage unit, the light diffusion controller controls the light diffusion device so that the light diffusion device is in the non-diffusion state when the light source starts to light up, and
 when information indicating illumination projection is stored in the storage unit, the light diffusion controller controls the light diffusion device so that the light diffusion device diffuses the light when the light source starts to light up.

13. The projector according to claim 9, further including a receiving unit which receives an illumination projection command,
 wherein in response to the reception of the illumination projection command by the receiving unit, the light diffusion controller controls the light diffusion device so that the light diffusion device is in the diffusing state.

14. The projector according to claim 13, wherein
 the receiving unit is able to communicate with an external network via wireless or wired connection, and
 the receiving unit receives the illumination projection command from the external network.

15. The projector according to claim 9, wherein the light diffusion device includes a PDLC device.

16. The projector according to claim 9, wherein the light diffusion device includes a focus-adjusting lens.

17. A projector comprising:
 a light source;
 a spatial light modulation device which modulates light from the light source according to an image that is written;
 a light diffusion device which adjusts a degree of diffusion of the light incident on the spatial light modulation device or the light emitted from the spatial light modulation device,
 the light diffusion device being switched at least between a diffusion state in which the light diffusion device diffuses the light and a non-diffusion state in which the light diffusion device does not substantially diffuse the light;
 a light diffusion controller which controls the light diffusion device such that when the projector operates as an illumination device, the light diffusion device is in the diffusion state, whereas when the projector operates as an image projection device, the light diffusion device is in the non-diffusion state; and
 a display controller which writes an image, into the spatial light modulation device;
 wherein when the light source starts to light up, the light diffusion controller controls the light diffusion device so that the light diffusion device is in the non-diffusion state and the display controller writes, into the spatial light modulation device, a user-interface image that allows selection of whether illumination projection is used or image projection is used, and
 when the illumination projection is selected, the light diffusion controller controls the light diffusion device so that the light diffusion device is in the diffusion state, whereas when the image projection is selected, the light diffusion device is in the non-diffusion state.

18. The projector according to claim 17, wherein the light diffusion device includes a PDLC device.

19. The projector according to claim 17, wherein the light diffusion device includes a focus-adjusting lens.

* * * * *